United States Patent [19]

Kawashima

[11] Patent Number: 5,355,360
[45] Date of Patent: Oct. 11, 1994

[54] SEMICONDUCTOR LASER CONTROLLING APPARATUS

[75] Inventor: Hisanori Kawashima, Hachioji, Japan

[73] Assignee: Konica Corporation, Tokyo, Japan

[21] Appl. No.: 32,649

[22] Filed: Mar. 17, 1993

[30] Foreign Application Priority Data

Apr. 10, 1992 [JP] Japan .................. 4-090681

[51] Int. Cl.$^5$ .............................................. G11B 7/00
[52] U.S. Cl. ...................... 369/116; 369/121
[58] Field of Search ............... 369/116, 121, 122, 124, 369/128, 54, 44.29, 44.35, 44.36

[56] References Cited

U.S. PATENT DOCUMENTS 5,134,606 7/1992 Sekiguchi et al. ............... 369/116
5,251,199 10/1993 Utsumi et al. .................. 369/116

Primary Examiner—Paul M. Dzierzynski
Assistant Examiner—Kiel T. Nguyen
Attorney, Agent, or Firm—Finnegan, Henderson, Farabow, Garrett & Dunner

[57] ABSTRACT

A laser beam controller of a semiconductor laser generator to read, write, and erase an information signal on a recording medium. Includes a generator of a variable-strength laser beam to read, write and erase the information signal on the recording medium; a first power supply of a first current to generate a laser beam to read the information signal; a second power supply of a second current to generate a laser beam to write or erase the information signal; and a controller circuit of the first and the second power supply. The controller circuit includes; a) a first sampling circuit of a first value of the first current; b) a comparator of the first value with a predetermined reference value; c) a current adjusting circuit of the first current according to a result of the comparison of the first value with the predetermined first reference value; d) a second sampling circuit of a second value of the first current after the first current is adjusted by the current adjusting circuit; and e) a holding circuit of the second value of the first current so that the controller circuit controls the first power supply to supply the first current at the second value to the generator. In this laser beam controller, the controller circuit controls the second power supply according to the second value of the first current so that the second supplying supplies the second current to the generator.

3 Claims, 4 Drawing Sheets

SEMICONDUCTOR LASER CONTROLLING APPARATUS

BACKGROUND OF THE INVENTION

The present invention relates to a semiconductor laser control device for use in a photo (photomagnetic) disc, and more particularly, to a semiconductor laser control device comprising a current supplying source for signal reproduction and a current supplying source for recording and erasing and controlling beam output of the semiconductor laser.

FIG. 3 shows a conventional semiconductor laser control device. In the constitution shown in the figure, a controller controls all portions generally to control finally the output of semiconductor laser 6.

When reading (reproducing) signals recorded on an optical (photomagnetic) recording medium, first current supplying source 2 generates a current for signal reproduction, and semiconductor laser 6 receives the current to radiate. A part of the beam output of the semiconductor laser is subjected to photoelectric conversion conducted by beam-detecting monitor 7 provided integrally with or in the vicinity of the semiconductor laser 6, thus the beam output is obtained through monitor output processing element 8. Further, the beam output thus obtained is compared by processing circuit 9 with a reference value from controller 1, and the result of the comparison is subjected to sample-and-hold by means of sample-and-hold circuit 10. The result of the sample-and-hold causes the value of current from the second current supplying source 2 to be subjected to feedback control. In the manner mentioned above, the beam output for reproduction is controlled on a real time basis during reproduction so that the beam output may show the predetermined value.

On the other hand, when recording or erasing, second current supplying source 3 generates current for signal recording or signal erasing, and the current for recording and the current for reproduction are added in current adder 5 and the added current is received by the semiconductor laser 6 which radiates. A part of the beam output of the semiconductor laser is subjected to photoelectric conversion conducted by beam-detecting monitor 7 provided integrally with or in the vicinity of the semiconductor laser 6, thus the beam output is obtained through monitor output processing element 8. Further, the peak value held by peak-hold circuit 11 is compared by processing circuit 12 with a reference value from the controller 1. The result of the comparison causes the current value of the second current supplying source 3 to be subjected to feedback control. In the manner mentioned above, the beam output for recording or erasing is controlled on a real time basis so that the beam output may show the predetermined value.

In the constitution mentioned above, it is required that the controlling system operates at high speed because the beam output is controlled during operation.

A beam output for recording, in particular, is composed of pulses having an extremely narrow width. FIG. 4 shows that condition. Pulses shown in FIG. 4 (a) have a cycle period of 167 ns (6 MHz), for example, and pulse width thereof is 30 ns. Pulse rise time is about 5 ns.

Since each pulse is different from others during the operation of recording, each pulse is required to be detected in high fidelity. Therefore, beam-detecting monitor 7 and monitor output processing element 8 are required to be capable of operating at high speed for detecting the pulses in high fidelity. Since the pulse has an extremely short cycle, it is necessary to provide peak-and-hold circuit 11 in the previous step of processing circuit 12 to obtain what is shown in FIG. 4 (b).

A method of averaging wave height values instead of detecting each pulse is also considered, but it is feared that accuracy may be lowered.

The invention has been achieved to solve the problems mentioned above, and its object is to realize a semiconductor laser control device capable of being composed of simple circuits using no high speed circuit elements.

SUMMARY OF THE INVENTION

The means for solving the problems mentioned above is a semiconductor laser control device including; a first current supplying source that supplies an electric current for signal reproduction to a semiconductor laser; a second current supplying source that supplies an electric current for erasing; and a controller that controls values of current generated from the first and second current supplying sources. In the semiconductor laser control device, the controller controls output of a laser beam for recording before operations of reprqoduction, recording and erasing, and supplies continuously the current values of the second current supplying source during the holding time of the first current supplying source since the controlling current values of the first current supplying source is sampled and held. The semiconductor laser control device further sets a current for recording so that the beam output during the above period may show the stipulated value.

DETAILED DESCRIPTION OF THE INVENTION

Figure 1:
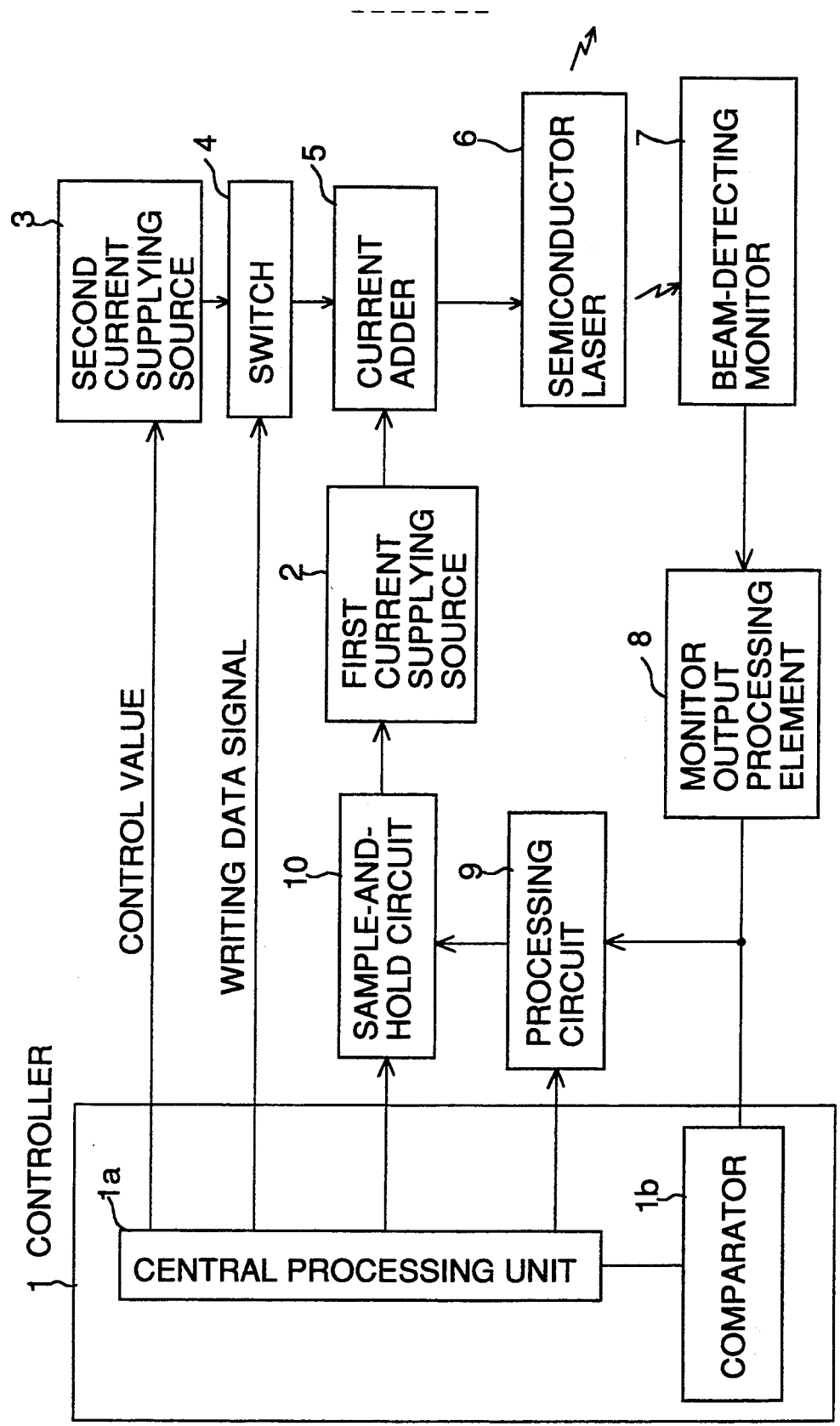
FIG. 1 is a block diagram showing constitution of an example of the invention.

Examples of the invention will be explained in detail as follows, referring to the drawings.

Figure 2:
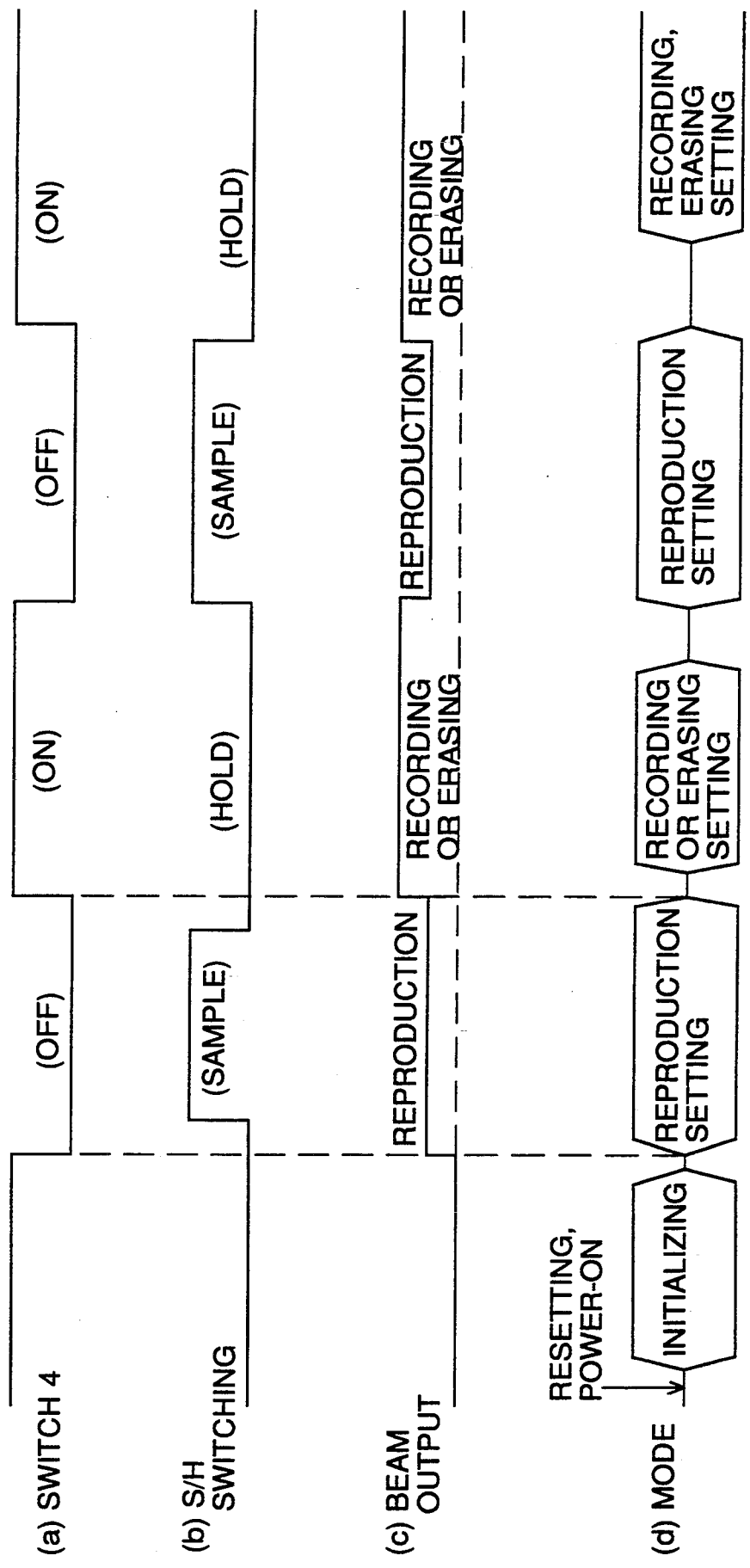
FIG. 2 is a wave form diagram showing signal wave forms of each portion in the device shown in FIG. 1.
Figure 3:
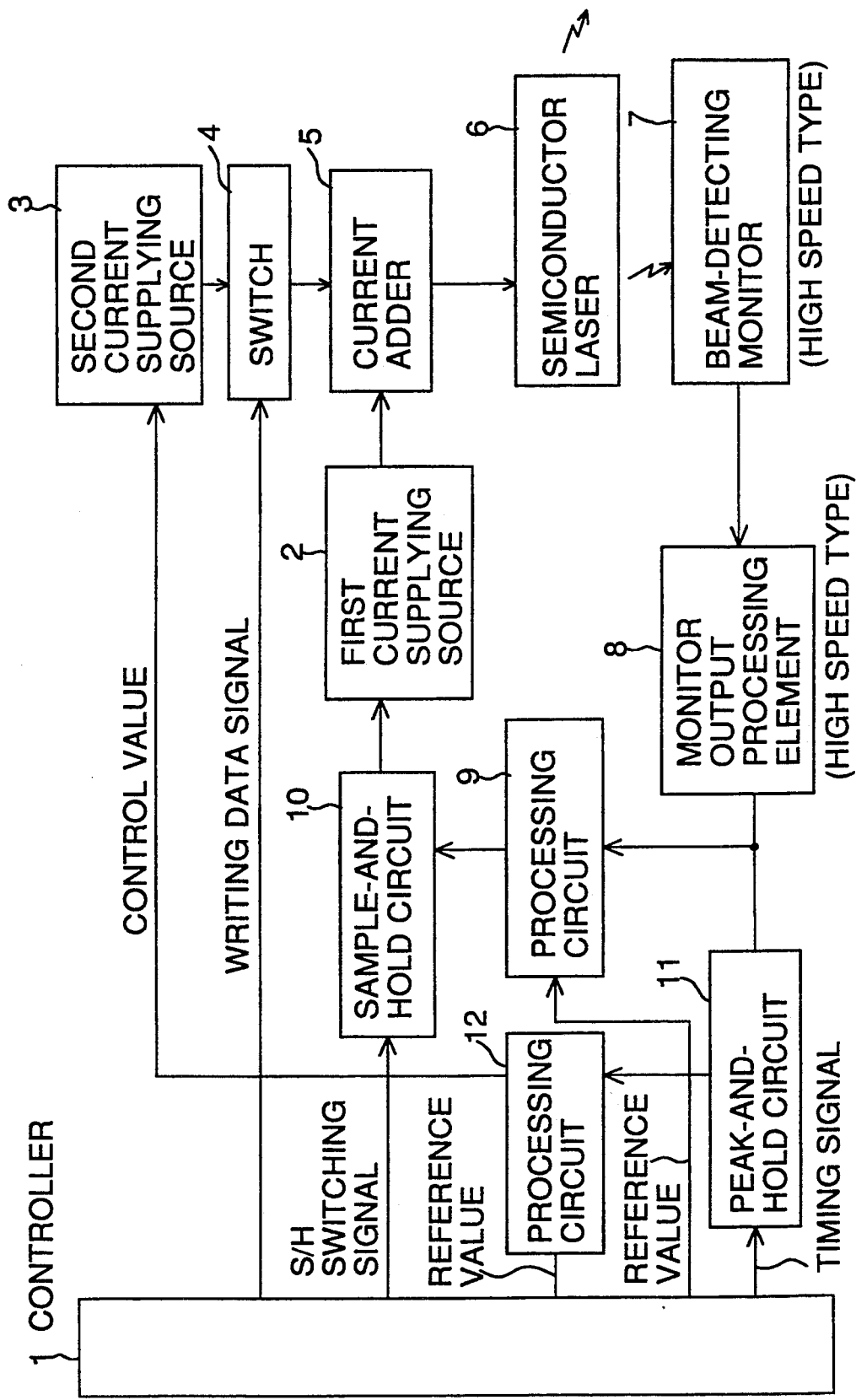
FIG. 3 is a block diagram of a conventional device.
Figure 4:
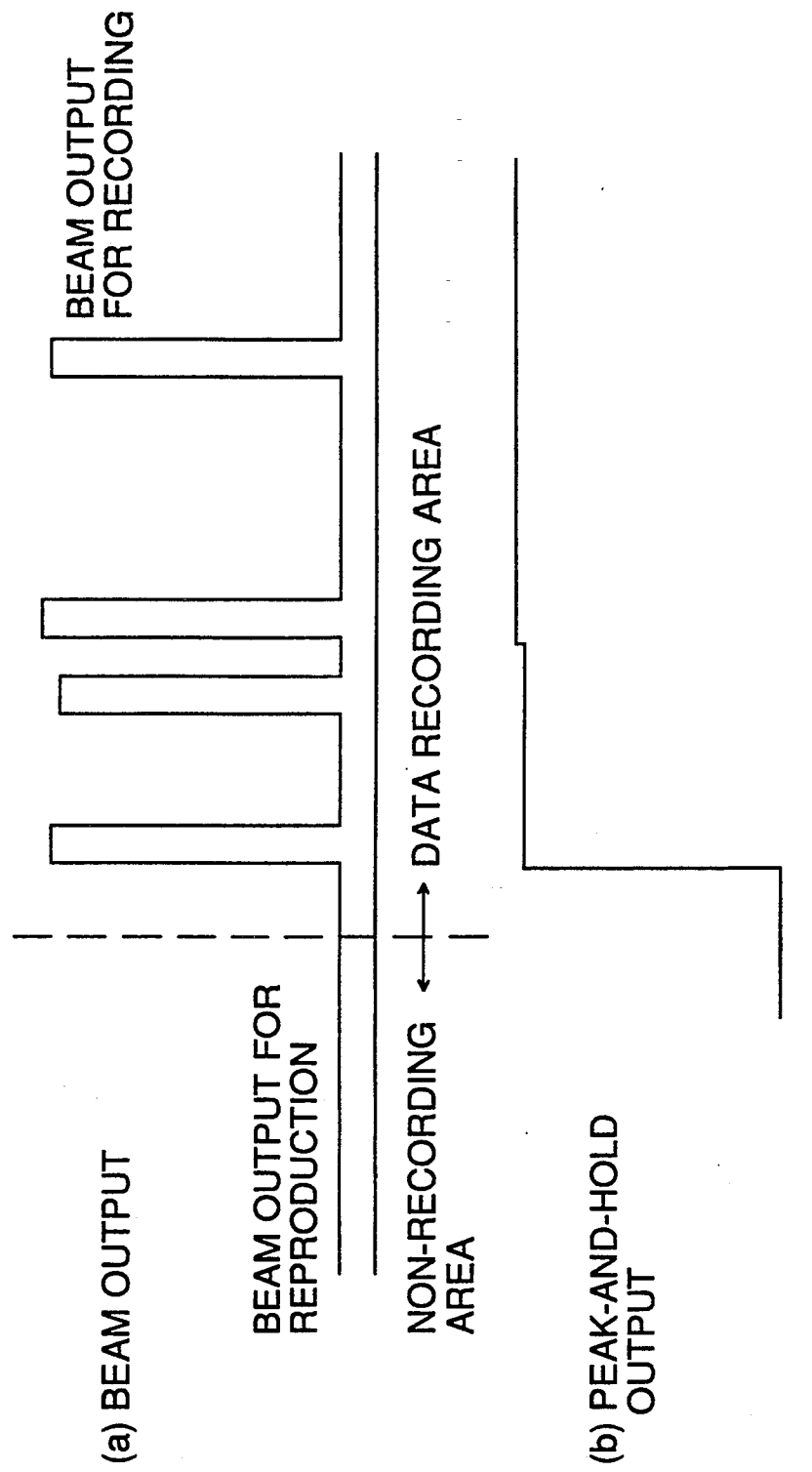
FIG. 4 is a wave form diagram showing signal wave forms of each portion in the conventional device.

FIG. 1 is a block diagram showing an entire structure of the present example. FIG. 2 is a wave form diagram showing signal wave forms in the operation of a device shown in FIG. 1.

In these drawings, controller 1 controls all portions generally, and the controller 1 controls the beam output of the semiconductor laser 6.

First, the device is initialized after starting its operation or resetting the device, and after that and before the moment of actual operation condition, the beam output level is set. In this particular example, beam output level for recording is also set before the normal operation of the device.

Current of predetermined value for reproduction generated by first current supplying source 2 causes semiconductor laser 6 to irradiate. This irradiation is converted photoelectrically by beam-detecting monitor 7 and beam intensity is detected by monitor output processing element 8. Then, the detected beam intensity is compared by processing circuit 9 with a reference value from controller 1, and a difference from referential irradiation intensity is outputted as a processed result. The processed result is sampled by sample-and-hold circuit 10 and fed back to the first current supplying source 2. Therefore, the irradiation intensity is determined by the reference value which is given to the processing circuit 9 by the controller 1. In this establishment of beam output level, the controller 1 causes the reference value to sweep from the lower level to the higher level. Thereby, the beam output level of the semiconductor laser 6 rises in accordance with the reference value. Under this condition, when the light intensity of monitor output processing element 8 reaches the predetermined value, the controller latches the reference value. This causes a value of current generated by the first current supplying source 2 to be the desired value. A result of computation made in the above stage by the processing circuit 9 is sampled by the sample-and-hold circuit 10 which has received instructions from central processing unit 1a.

Then, after the sample-and-hold circuit 10 has been brought to its holding state by the instructions of the central processing unit 1a, switch 4 is turned on to cause current from second current supplying source 3 to be added to current for reproduction at current adder 5 and to be supplied to the semiconductor laser 6.

Due to current for recording (erasing) having a prescribed value generated by the second current supplying source 3, the semiconductor laser 6 emits light. A part of the irradiation is converted photoelectrically by the beam-detecting monitor 7, and beam intensity is detected by monitor output processing element 8. Then, the detected beam intensity is compared by comparator 1b with a prescribed value for recording (erasing), and a difference from prescribed irradiation intensity for recording (erasing) is outputted as a processed result. Then, the processed result is sent to the central processing unit 1a wherein a control value for controlling the second current supplying source 3 is obtained. Under this condition, the control value from the controller 1 is increased gradually, during which the control value at the moment when the monitor output computation result agrees with the prescribed value is stored in the controller 1. In this way, the control value for recording (erasing) is determined. Incidentally, when the above-mentioned establishment is not completed during the holding time of the sample-and-hold circuit 1ng the holding time of the sample-and--hold circuit 10, establishment of current for recording is repeated after current for reproduction is sampled again.

Compared with the conventional setting of current level for recording on a real time basis, it is possible to establish the current level, in the longer time than the conventional setting, by using the present method of establishing the current level in advance of the actual operation. Therefore, the response speed of each portion in the circuit can be configured slower. Further, since an electric current for recording is established before the recording operation, a peak-hold circuit of a high speed type provided in the conventional circuit is not needed. Incidentally, the current for erasing can be determined similarly to that for recording.

In the invention as stated above, an output of a laser beam for recording is controlled before operations of reproduction, recording and erasing, and current values of the second current supplying source are supplied continuously in the course of the holding time for the first current supplying source while current values of the first current supplying source are being controlled by means of a sample-and-hold, and thereby an electric current for recording is set so that the beam output level during the above period may show the stipulated value. It is therefore possible to realize a semiconductor laser device which may be composed of simple circuits without needing high speed circuit elements.

What is claimed is:

1. An apparatus for controlling a semiconductor laser generator to read, write, or erase an information signal on a recording medium, comprising:
   means for generating a variable-strength laser beam to read, write, or erase the information signal on the recording medium;
   a first means for supplying a first current to said generating means to read said information signal;
   a second means for supplying a second current to said generating means to write or erase said information signal, and
   means for controlling said first and second supplying means, said controlling means including;
   a) means for sampling a first value of said first current;
   b) means for comparing said first value with a predetermined first reference value;
   c) means for adjusting said first current according to a result of the comparison of said first value with said predetermined first reference value;
   d) means for sampling a second value of said first current after said first current is adjusted by said adjusting means; and
   e) means for holding said second value of said first current so that said controlling means controls said first supplying means to supply said first current at said second value to said generating means;
   wherein said controlling means controls said second supplying means according to said second value of said first current so that said second supplying means supplies said second current to said generating means.

2. The apparatus of claim 1, wherein said controlling means further comprises;
   means for sampling a first value of said second current;
   means for comparing said first value of said second current with a predetermined second reference value;
   means for adjusting said second current according to a result of the comparison of said first value of said second current with said predetermined second reference value;
   means for sampling a second value of said second current after said second current is adjusted by said adjusting means; and
   means for holding said second value of said second current so that said controlling means controls said second supplying means to supply said second current at said second value to said generating means.

3. The apparatus of claim 2, wherein said means for holding said second value of said first current and said means for holding said second value of said second current hold said second value of said first current and said second value of said second current before said apparatus starts operations to read, write, or erase said information signal.

* * * * *

UNITED STATES PATENT AND TRADEMARK OFFICE
CERTIFICATE OF CORRECTION

PATENT NO. : 5,355,360
DATED : October 11, 1994
INVENTOR(S) : Hisanori KAWASHIMA It is certified that error appears in the above-indentified patent and that said Letters Patent is hereby corrected as shown below:

On the title page, item [57]
Abstract, front page, line 4 change ". Includes"

to --includes--.

Signed and Sealed this

Thirteenth Day of June, 1995

Attest:

BRUCE LEHMAN

Attesting Officer         Commissioner of Patents and Trademarks